US011636304B2

(12) United States Patent
Rakshit et al.

(10) Patent No.: US 11,636,304 B2
(45) Date of Patent: Apr. 25, 2023

(54) CREATING RESPONSE SCHEDULE FOR TASKS FROM COGNITIVE STATE OF A USER

(71) Applicant: International Business Machines Corporation, Armonk, NY (US)

(72) Inventors: Sarbajit K. Rakshit, Kolkata (IN); John M. Ganci, Jr., Raleigh, NC (US); James E. Bostick, Cedar Park, TX (US); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 475 days.

(21) Appl. No.: 16/733,920

(22) Filed: Jan. 3, 2020

(65) Prior Publication Data

US 2021/0209440 A1 Jul. 8, 2021

(51) Int. Cl.
| | | |
|---|---|---|
| *G06N 3/004* | (2023.01) | |
| *G06N 5/04* | (2023.01) | |
| *G06Q 10/0631* | (2023.01) | |
| *G10L 15/22* | (2006.01) | |
| *G10L 15/19* | (2013.01) | |
| *G06N 3/02* | (2006.01) | |
| *G10L 15/08* | (2006.01) | |
| *G06N 20/00* | (2019.01) | |

(52) U.S. Cl.
CPC ............... *G06N 3/004* (2013.01); *G06N 5/04* (2013.01); *G06Q 10/06311* (2013.01); *G10L 15/22* (2013.01); *G06N 3/02* (2013.01); *G06N 20/00* (2019.01); *G10L 15/19* (2013.01); *G10L 2015/088* (2013.01); *G10L 2015/223* (2013.01)

(58) Field of Classification Search
CPC ............... G10L 15/22; G10L 2015/221; G10L 2015/223; G10L 2015/227; G10L 2015/228; G10L 2015/226; G06Q 10/06311; G06Q 10/06312
USPC .... 704/236, 270, 270.1, 275; 705/7.13, 7.15
See application file for complete search history.

(56) References Cited

U.S. PATENT DOCUMENTS

| | | | |
|---|---|---|---|
| 8,762,154 B1 * | 6/2014 | Witt-ehsani | ............ G10L 25/48 704/270.1 |
| 9,386,152 B2 | 7/2016 | Riahi et al. | |
| 9,697,286 B2 | 7/2017 | Hewitt et al. | |
| 10,192,070 B1 | 1/2019 | Hodge | |
| 10,613,899 B1 * | 4/2020 | Saha | ..................... G06N 20/00 |

(Continued)

OTHER PUBLICATIONS

Grace et al., When Will AI Exceed Human Performance? Evidence from AI Experts, May 3, 2018. (21 Pages).

(Continued)

*Primary Examiner* — Martin Lerner
(74) *Attorney, Agent, or Firm* — Garg Law Firm, PLLC; Rakesh Garg; Michael O'Keefe

(57) ABSTRACT

In an embodiment, cognitive adjustment of responses from a virtual assistant includes detecting verbal content in an audio signal, determining that the verbal content includes a voice command associated with a task by correlating the verbal content with voice command data stored in memory, determining a state of the user from the audio signal by cognitively comparing aspects of the verbal content with aspects of profile data associated with the user, and retrieving task data associated with the task for preparing a response to the voice command.

20 Claims, 6 Drawing Sheets

(56) References Cited

U.S. PATENT DOCUMENTS

| | | | |
|---|---|---|---|
| 11,049,077 B1* | 6/2021 | Vukich | G06Q 10/1095 |
| 11,093,886 B2* | 8/2021 | Bhatt | G06Q 10/0633 |
| 2006/0166174 A1 | 7/2006 | Rowe et al. | |
| 2013/0226578 A1* | 8/2013 | Bolton | G10L 15/22 704/235 |
| 2014/0108078 A1* | 4/2014 | Davis | G06Q 30/0611 705/7.14 |
| 2016/0342900 A1* | 11/2016 | Allen | G06F 40/295 |
| 2017/0162197 A1* | 6/2017 | Cohen | G10L 15/22 |
| 2017/0220199 A1 | 8/2017 | Huppi et al. | |
| 2018/0204570 A1* | 7/2018 | Puranik | G10L 15/22 |
| 2018/0218293 A1* | 8/2018 | Schlesinger | G06F 3/167 |
| 2018/0285804 A1* | 10/2018 | Lee | G10L 15/22 |
| 2018/0336449 A1* | 11/2018 | Adan | G10L 15/22 |
| 2018/0341891 A1* | 11/2018 | Setchell | G06Q 10/06311 |
| 2020/0111487 A1* | 4/2020 | Sanganabhatla | G10L 15/22 |
| 2020/0193264 A1* | 6/2020 | Zavesky | G10L 15/22 |
| 2020/0310749 A1* | 10/2020 | Miller | G10L 15/22 |

OTHER PUBLICATIONS

Murphy, Artificial Intelligence Applications to Support K-12 Teachers and Teaching—A Review of Promising Applications, Challenges, and Risks, RAND Corporation, Jan. 2019, https://www.rand.org/pubs/perspectives/PE315.html. (20 Pages).

IP.com, Method and System for Providing an AI Based Voice Response System Based on Storytelling Activities of a User, Apr. 25, 2019, https://ip.com/IPCOM/000258284, (3 Pages).

IP.com, Method and system for voice response system to consider a short-term and long-term information about any user while executing any voice command, Oct. 19, 2018, https://ip.com/IPCOM/000255904, (4 Pages).

IP.com, Method for Real-Time Voice Communication, Sep. 6, 2018, https://ip.com/IPCOM/000255169, (23 Pages).

* cited by examiner

CREATING RESPONSE SCHEDULE FOR TASKS FROM COGNITIVE STATE OF A USER

TECHNICAL FIELD

The present invention relates generally to a method, system, and computer program product for artificial intelligence based virtual assistants. More particularly, the present invention relates to a method, system, and computer program product for cognitive adjustment of responses from virtual assistants.

BACKGROUND

Artificial intelligence (AI) technology has evolved significantly over the past few years and have given way to a new class of devices referred to as AI virtual assistants. AI virtual assistants are able to understand and respond to voice commands due in part to advances in various types of AI technologies.

For example, an Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

A Deep Learning Neural Network, referred to herein as a Deep Neural Network (DNN) is an artificial neural network (ANN) with multiple hidden layers of units between the input and output layers. Similar to shallow ANNs, DNNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network. DNNs are typically designed as feedforward networks.

SUMMARY

The illustrative embodiments provide for cognitive adjustment of responses from virtual assistants. An embodiment includes detecting, using a processor, verbal content in an audio signal. The embodiment also includes determining, using the processor, that the verbal content includes a voice command associated with a task by correlating the verbal content with voice command data stored in memory. The embodiment also includes determining, using the processor, a state of the user from the audio signal by cognitively comparing aspects of the verbal content with aspects of profile data associated with the user. The embodiment also includes retrieving, using the processor, task data associated with the task for preparing a response to the voice command. The embodiment also includes creating, using the processor, a response schedule for the response based at least in part on the task data and the state of the user. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
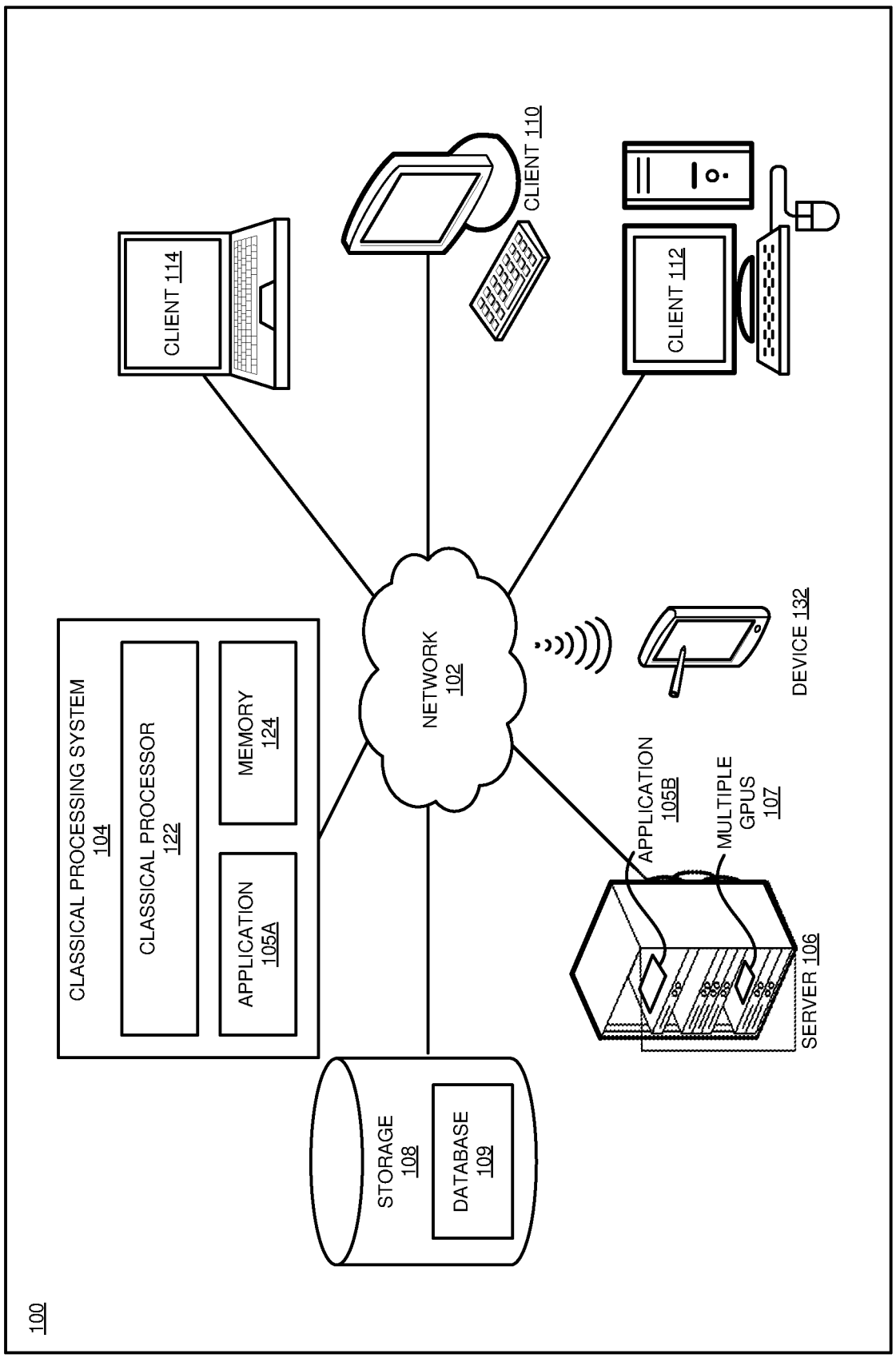
FIG. 1 depicts a block diagram of a network of data processing systems in which illustrative embodiments may be implemented.

AI virtual assistants are becoming increasingly prevalent. These virtual assistant devices learn voice commands from a user and attempt to provide cognitive responses to the voice commands. Typical voice commands can range from requesting current weather or traffic conditions, to requesting travel directions or a movie schedule. The virtual assistant attempts to understand the voice command, retrieve the information requested, and issue a single response to the command that includes all of the retrieved information. However, different users have different preferences in the level of detail and the amount of information they would like to receive at any given time from a virtual assistant. As a result, some users get frustrated and are dissatisfied with current virtual assistants. Also, when a user is requesting information for a relatively complex task, receiving a long verbal response that includes the entire set of instructions all at once can be troublesome for some users who will find it difficult to remember so much material at once, which could lead to errors and frustration on the part of the user.

The illustrative embodiments recognize that there is a need to improve the ability of virtual assistants to provide responses to user commands that are better tailored to the user's preferences. The illustrative embodiments also recognize that there is a need to provide an option for a user to utilize the virtual assistant as an observer while performing a task in order to detect errors and inform the user of such errors.

In an embodiment, an artificial intelligence (AI) virtual assistant, also referred to herein as a virtual assistant or a voice response system, uses natural language processing (NLP) to match user text or voice input to executable commands. In an embodiment, the virtual assistant is always on and listening for a command. There are several possible commands, including common words that a user may speak in casual conversation that would trigger some action by the virtual assistant. To avoid this problem, the virtual assistant stays in a standby mode until it detects a specific wake word through a listening device. In an embodiment, the virtual assistant is always listening through a listening device to detect whether a user has spoken the wake word. When the virtual assistant detects the wake word, it begins listening for a predetermined amount of time for any of the commands that the virtual assistant recognizes. In an embodiment, if the virtual assistant does not receive a voice command within a predetermined amount of time, it will return to the standby mode listening only for the wake word.

In an illustrative embodiment, a virtual assistant detects verbal content in an audio signal, and determines that the verbal content includes a voice command associated with a task by correlating the verbal content with voice command data stored in memory. In an embodiment, the virtual assistant applies speech-to-text natural language processing (NLP) algorithms to the audio signal to generate a text transcription of the incoming audio. In some embodiments, the virtual assistant then applies additional NLP algorithms and/or machine learning (ML) algorithms to extract grammatical features of the dialogue (e.g., to identify tone, sentiment, etc.), eliminate noise, and identify references to voice commands.

In an illustrative embodiment, a virtual assistant determines a state of the user from the audio signal by cognitively comparing aspects of the verbal content with aspects of profile data associated with the user. In an embodiment, the virtual assistant applies speech-to-text NLP algorithms to the audio signal to generate a text transcription of the incoming audio. In some embodiments, the virtual assistant then applies additional NLP algorithms and/or ML algorithms to extract grammatical features of the dialogue (e.g., to identify tone, sentiment, etc.), eliminate noise, identify references to voice commands, and classify the audio according to a degree of urgency.

In an illustrative embodiment, a virtual assistant detects verbal content in an audio signal, and determines that the verbal content includes a voice command associated with a task. In some embodiments, the virtual assistant retrieves task data associated with the task for preparing a response to the voice command. In some embodiments, the virtual assistant creates a response schedule for the response based at least in part on the task data.

In an illustrative embodiment, a virtual assistant detects a voice command from a user, where the voice command is associated with a task, and determines a state of the user from an audio signal by cognitively comparing aspects of verbal content of the audio signal with aspects of profile data associated with the user. In an embodiment, the virtual assistant applies additional NLP algorithms and/or ML algorithms to the audio signal to classify the audio according to a degree of urgency. In an embodiment, the virtual assistant creates a response schedule for a response to the voice command based at least in part on task data associated with the task and the state of the user.

In an illustrative embodiment, a virtual assistant detects verbal content in an audio signal, and determines that the verbal content includes a voice command associated with a task, and determines a state of the user from the audio signal by cognitively comparing aspects of verbal content of the audio signal with aspects of profile data associated with the user. In an embodiment, the virtual assistant applies additional NLP algorithms and/or ML algorithms to the audio signal to classify the audio according to a degree of urgency. In some embodiments, the virtual assistant retrieves task data associated with the task for preparing a response to the voice command. In an embodiment, the virtual assistant creates a response schedule for a response to the voice command based at least in part on task data associated with the task and the state of the user.

In an illustrative embodiment, a virtual assistant detects verbal content in an audio signal, and determines that the verbal content includes a voice command associated with a task. In some embodiments, the virtual assistant retrieves task data associated with the task for preparing a response to the voice command. In some embodiments, the virtual assistant creates a response schedule for the response based at least in part on the task data. In an embodiment, as part of creating the response schedule, the virtual assistant identifies a first part of the response and a second part of the response and establishes a condition for issuing the second part of the response.

In an illustrative embodiment, a virtual assistant detects verbal content in an audio signal, and determines that the verbal content includes a voice command associated with a task. In some embodiments, the virtual assistant retrieves task data associated with the task that includes descriptions of first and second steps for completing the task. In some embodiments, the virtual assistant creates a response schedule for the response based at least in part on the task data. In an embodiment, as part of creating the response schedule, the virtual assistant identifies a first part of the response associated with the first step, and identifies a second part of the response associated with the second step. In an embodiment, the virtual assistant establishes a condition for issuing the second part of the response, where the condition is based at least in part on a time estimate associated with the first step. In some embodiments, the time estimate is based at least in part on user profile information that includes an amount of time used by the user to complete the first step during a previous performance of the task.

In an illustrative embodiment, a virtual assistant detects verbal content in an audio signal, and determines that the verbal content includes a voice command associated with a task, and determines a state of the user from the audio signal by cognitively comparing aspects of verbal content of the audio signal with aspects of profile data associated with the user. In an embodiment, the virtual assistant applies additional NLP algorithms and/or ML algorithms to the audio signal to classify the audio according to a degree of urgency. In some embodiments, the virtual assistant retrieves task data associated with the task that includes descriptions of first and second steps for completing the task. In an embodiment, the virtual assistant creates a response schedule for a response to the voice command based at least in part on task data associated with the task and the state of the user. In an embodiment, the response includes information associated with the first step and information associated with the second step. In some embodiments, a condition for issuing the information associated with the second step is based at least in part on a time estimate associated with the first step and based at least in part on the degree of urgency.

In an illustrative embodiment, a virtual assistant detects verbal content in an audio signal, and determines that the verbal content includes a voice command associated with a task. In some embodiments, the virtual assistant retrieves task data associated with the task for preparing a response to the voice command. In some embodiments, the virtual assistant creates a response schedule for the response based at least in part on the task data. In an embodiment, as part of creating the response schedule, the virtual assistant identifies a first part of the response and a second part of the response and establishes a condition for issuing the second part of the response. In an embodiment, the virtual assistant monitors sensor data for information indicative of the user's performance of the task while the user is performing the task. In an embodiment, the virtual assistant determines an amount of progress made by the user in performing the task by cognitively comparing aspects of the sensor data with information associated with the task. In an embodiment, the virtual assistant determines whether the amount of progress made by the user satisfies the condition for issuing the second part of the response.

In an illustrative embodiment, a virtual assistant detects verbal content in an audio signal, and determines that the verbal content includes a voice command associated with a task, and determines a state of the user from the audio signal by cognitively comparing aspects of verbal content of the audio signal with aspects of profile data associated with the user. In an embodiment, the virtual assistant applies additional NLP algorithms and/or ML algorithms to the audio signal to classify the audio according to a degree of urgency. In some embodiments, the virtual assistant retrieves task data associated with the task that includes descriptions of first and second steps for completing the task. In an embodiment, the virtual assistant creates a response schedule for a response to the voice command based at least in part on task data associated with the task and the state of the user. In an embodiment, the virtual assistant monitors sensor data for information indicative of the user's performance of the task while the user is performing the task. In an embodiment, the virtual assistant determines an amount of progress made by the user in performing the task by cognitively comparing aspects of the sensor data with information associated with the task. In an embodiment, the virtual assistant determines whether the amount of progress made by the user satisfies the condition for issuing the second part of the response.

In an embodiment, the virtual assistant determines an amount of progress made by the user in performing the task by cognitively comparing aspects of the sensor data where the sensor data includes audio and video data. In an embodiment, the virtual assistant applies speech-to-text NLP algorithms to the audio signals to generate a text transcription of the incoming audio data. In some embodiments, the virtual assistant then applies additional NLP algorithms and/or ML algorithms to identify references to the task and classifies the audio according to an amount of detected progress in performing the task. In an embodiment, the audio is received with video in a combined audio/video signal. In an embodiment, the virtual assistant subjects the video signal to a frame extraction module, and then processes the frames using a neural network, such as a Deep Neural Network (DNN), for example a Convolutional Neural Network (CNN), or to classify the images according to an amount of detected progress in performing the task. In some embodiments, the detection system includes a fusion unit to align the processed audio and video and generate a combined score indicative of the amount of detected progress in performing the task.

In an illustrative embodiment, a virtual assistant detects verbal content in an audio signal, and determines that the verbal content includes a voice command associated with a task. In some embodiments, the virtual assistant retrieves task data associated with the task for preparing a response to the voice command. In some embodiments, the virtual assistant creates a response schedule for the response based at least in part on the task data. In an embodiment, as part of creating the response schedule, the virtual assistant identifies a first part of the response and a second part of the response and establishes a condition for issuing the second part of the response. In an embodiment, the virtual assistant monitors sensor data for information indicative of the user's performance of the task while the user is performing the task. In some embodiments, the virtual assistant performs a cognitive process using the sensor data that compares the sensor data with information associated with the task and provides an indication of a likelihood of an error by the user while performing the task. In some embodiments, responsive to determining that the user likely committed an error in the task, the virtual assistant notifies the user about the error. In some embodiments, the notification includes repeating at least a portion of the response regarding the portion of the task where the error occurred.

In an illustrative embodiment, a virtual assistant detects verbal content in an audio signal, and determines that the verbal content includes a voice command associated with a task, and determines a state of the user from the audio signal by cognitively comparing aspects of verbal content of the audio signal with aspects of profile data associated with the user. In an embodiment, the virtual assistant applies additional NLP algorithms and/or ML algorithms to the audio signal to classify the audio according to a degree of urgency. In an embodiment, the virtual assistant creates a response schedule for a response to the voice command based at least in part on task data associated with the task and the state of the user. In an embodiment, the virtual assistant monitors sensor data for information indicative of a possible state change of the user while the user is performing the task. In an embodiment, the virtual assistant performs a cognitive process that uses the information indicative of the possible state change of the user and profile data associated with the user to determine that the user's state has changed and to determine the new state of the user. In an embodiment, the virtual assistant updates the response schedule based at least in part on the new, updated state of the user.

For example, if the state of the user is detected to have become increasingly anxious or frustrated due to the response by the virtual assistant being too verbose, the virtual assistant generates a terser response for the revised response schedule. On the other hand, if the state of the user is detected to have become confused or anxious due to the instructions being given too quickly or too much at once, the virtual assistant generates a revised response schedule that slows down the response and/or repeats some or all of the response. Also, in some embodiments, the virtual assistant updates the user profile with profile data indicative of the user preference for a more verbose or less verbose type of response.

In some embodiments, a virtual assistant stores profile data associated with the user that includes an indication of types of voice responses that the user prefers to receive all at once, and types of voice responses that the user prefers to be delivered in multiple voice responses, for example aligned with user's activity progress and pattern of performing the activity such pausing and resuming between steps, or with adjustments in speed for user anxiety or frustration. For example, in an embodiment, a user prefers responses all at once for commands regarding weather information and traffic conditions, but prefers responses to be aligned to progress of step in user's activity for commands regarding configuration of smart home Internet of Things (IoT) devices for automation, installation and configuration of software, and regarding food preparation.

In some embodiments, a virtual assistant captures data from various data sources (e.g., IoT device sensors and video cameras in a smart home, and/or wearable biometric data) to learn the user's current step in an activity sequence and/or to determine if the user is performing a step correctly. In some embodiments, data sources include IoT devices in smart home, wearable devices, mobile devices, and/or social media. Social media data may be used to determine a user's knowledge level for a given activity and ability to receive knowledge from the virtual assistant on steps of a task. Data sources may also include a repository of previous voice commands and context and can include common pitfalls (missing or very similar) from a master knowledge base or repository of knowledge shared amongst multiple AI devices from this user and/or other users. Data sources containing historic data specific to this user may include information such as tasks mastered by this user or tasks where the user has made errors in the past.

In some embodiments, the virtual assistant includes data regarding user preferences for receiving voice affirmations for correctly completing a step. In an embodiment, the virtual assistant is configurable to enable or disable response affirmations to the user when the user has completed a step correctly. In some embodiments, this can also be implemented based on the user's skill level in performing a user activity whereby once a user's skill is demonstrated, the virtual assistant will not affirm when step is repeated in performing same activity.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Further-more, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
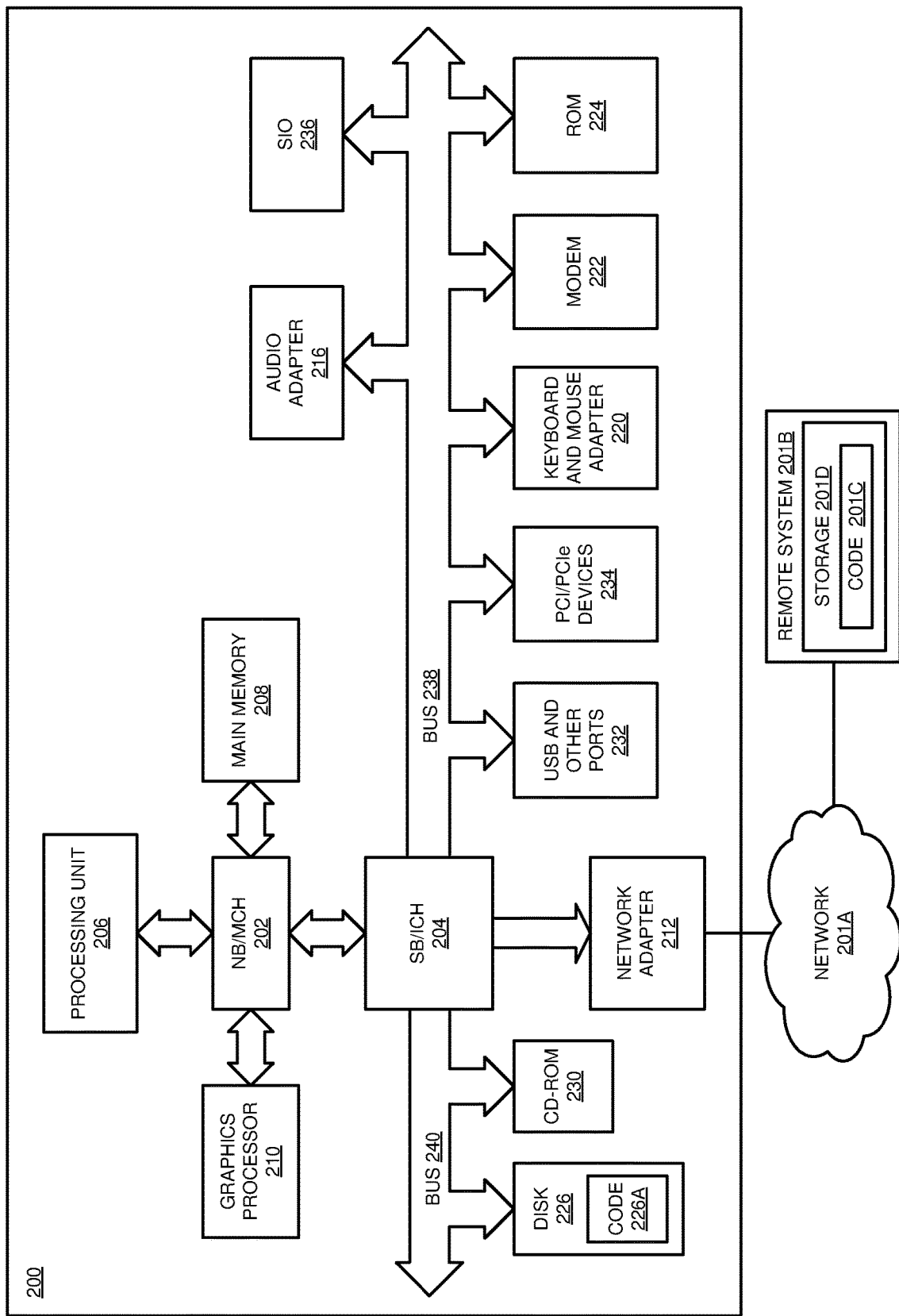
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes neural network application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by neural network application 105B such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of neural network application 105A of data processing system 104 and neural network application 105B of server 106 implements an embodiment of a neural network, such as a DNN, as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
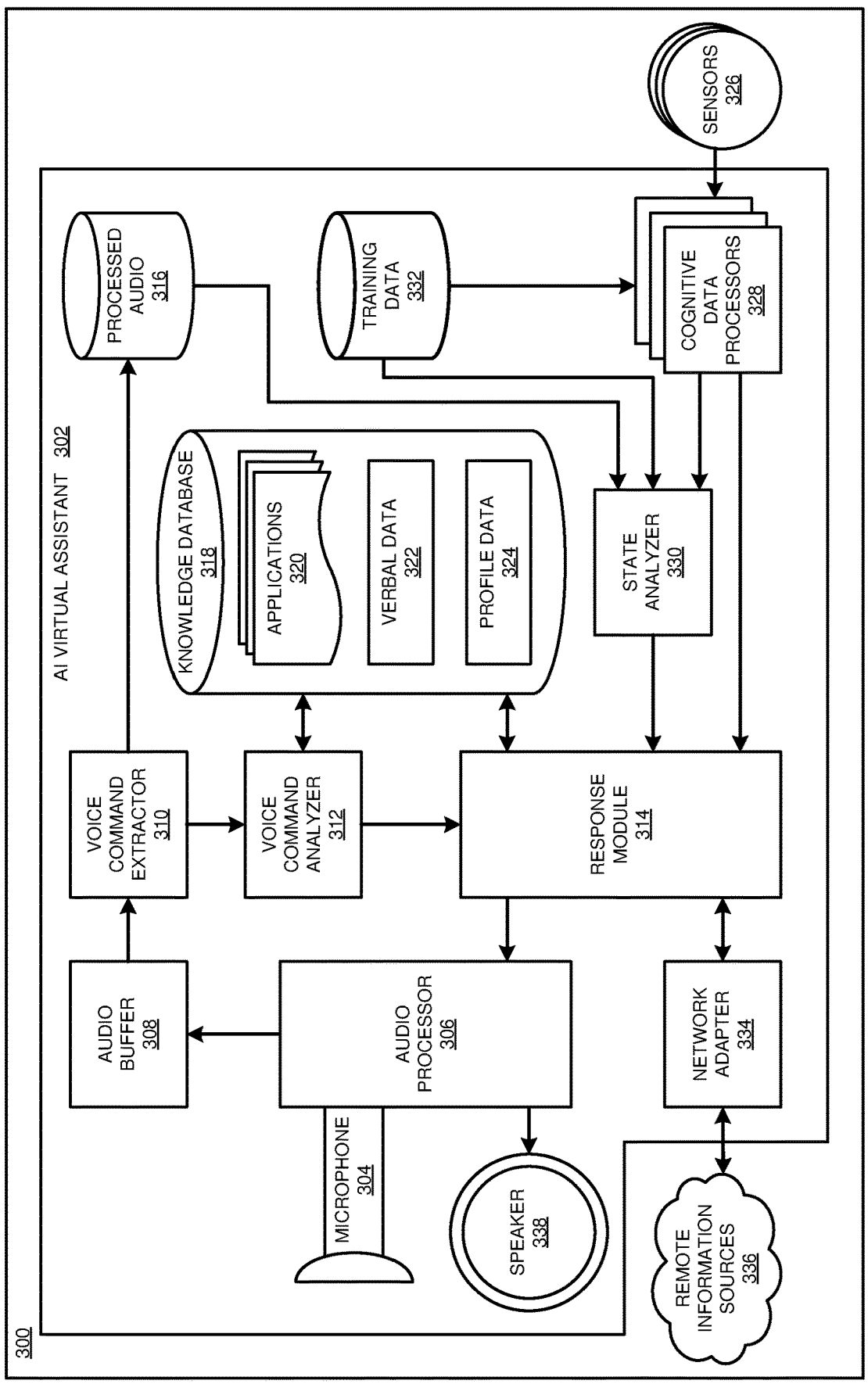
FIG. 3 depicts a block diagram of an example configuration of an AI-based virtual assistant in accordance with an illustrative embodiment.

With reference to FIG. 3, this figure depicts a block diagram of an example environment 300 that includes an AI virtual assistant 302 in accordance with an illustrative embodiment. The example embodiment includes several cognitive or machine-learning modules that can separately or collectively serve as examples of applications 105A/105B of FIG. 1, including a voice command extractor 310, voice command analyzer 312, response module 314, cognitive data processors 328, and state analyzer 330.

In some embodiments, the virtual assistant 302 includes a microphone 304 that receives audio and generates audio signals that are delivered to an audio processor 306 that conditions the audio signal for voice-recognition processing, for example by adjusting the signal level and filtering the signal to exclude components that are likely to interfere with voice-recognition processing. The incoming audio signal is then delivered to an audio buffer 308. In an embodiment, the audio buffer 308 includes a circular buffer that functions as storage for recorded audio and is designed to record a sufficient amount of audio that allows for determining whether a voice command is present. For example, in some embodiments, the circular buffer stores two minutes of audio before overwriting previously-stored audio in a first-in-first-out (FIFO) configuration.

In some embodiments, the virtual assistant includes a voice command extractor 310 that is configured to apply speech-to-text NLP algorithms to generate a text transcription of the incoming audio. In some embodiments, the voice command extractor 310 stores the transcription in the processed audio memory 316 and provides the transcription to the voice command analyzer 312. The voice command analyzer 312 functions as an interface between the text representation of the captured audio and a corpus or knowledge database 318 and searches for correlations between the captured audio and applications data 320 or verbal data 322. In an embodiment, the applications data 320 includes data associated with applications that can be run on the virtual assistant, such as weather or calendar applications. In an embodiment, the verbal data 322 can include data related to system commands, for example a wake word or phrase, or a command for adjusting system settings such as volume or network settings.

In an embodiment, once the voice command analyzer 312 recognizes the voice command, it notifies a response module 314 to prepare a response to the voice command. In some embodiments, the response module 314 also receives user state information from a state analyzer 330. In some embodiments, the state analyzer performs a cognitive analysis of the transcription in the processed audio memory 316. For example, in some embodiments, the state analyzer 330 includes a DNN that receives the transcription from the memory 316 and applies machine learning algorithms to extract grammatical features of the dialogue (e.g., to identify tone, sentiment, etc.), eliminate noise, identify references to feelings of urgency or anxiety or frustration, and output a score indicative of whether the user is in a calm or anxious state. In an embodiment, the state analyzer 330 uses public databases, a pretrained model, and/or the user's historical data as training data 332 to train the DNN algorithm to identify indicators of the user's mental state.

In some embodiments, the state analyzer 330 also uses information from sensors 326 that are external to the virtual assistant 302, including sensors of other devices that are configured to communicate sensor data to the virtual assistant. For example, in some embodiments, sensors 326 include sensors, such as cameras, microphones, and biometric sensors, on one or more of a smartphone, an IoT device, a motion sensor, a passive infrared sensor, a thermal sensor, a video camera, and a wearable device, such as a smart watch, an activity monitor, or a smart fabric or textile worn by the user. In the illustrative embodiment, the sensors 326 provide sensor data to the virtual assistant 302 for local cognitive processing by one or more cognitive data processors 328. In some embodiments, one or more of the sensors 326 are in communication with cognitive processing systems that can be remotely used by the virtual assistant 302, for example via an API.

In an embodiment, sensor data from one or more sensors 326 is evaluated by one or more cognitive data processors 328 using DNNs or other processes to output respective scores indicative of the user's mental state. In an embodiment, the cognitive data processors 328 use public databases, a pretrained model, and/or the user's historical data as training data 332 to train the respective DNN algorithms to identify indicators of the user's mental state. The various scores are then provided to the state analyzer 330, which then combines the scores, for example by averaging the scores to determine an overall score indicative of the user's mental state. The state analyzer then provides the user's mental state information to the response module 314. In some embodiments, the response module 314 receives mental state information from the state analyzer 330 and/or other cognitive data processors 328 after receiving the initial voice command and on an ongoing basis during extended interactions between the virtual assistant 302 and the user.

In an embodiment, the response module 314 prepares a response to the voice command by collecting information for the content of the response, and collecting information for the timing of the response. The content of the response refers to information that the user is requesting, for example the current weather, traffic conditions, a recipe, or instructions for configuring an IoT device. The timing of the response refers to whether the response is more terse or verbose, and whether the information is given all at once, or if there are pauses in the information, for example to allow for feedback or completion of a task by the user. As a non-limiting example, if a user asks for current weather conditions, a terse response may simply be "78 degrees and sunny" whereas a verbose response may begin "The current weather conditions include sunny skies, and a current temperature of 78 degrees . . . ." Another example involving a response to a user request for instructions is shown in FIG. 4 and described below.

In some embodiment, the response module 314 obtains the content of the response from local memory and/or from remote data sources. For example, in some embodiments, the response module 314 collects information for the content of the response from Internet resources using a network adapter 334 to connect to one or more remote information sources 336. In some embodiments, the response module 314 collects information for the content of the response from a corpus of knowledge shared with one or more other AI devices via the Internet or other method of communication, for example using a peer-to-peer network connection.

In an embodiment, once the response module 314 collects the information for the content of the response, and the information for the timing of the response, the response module 314 prepares a response and issues at least a portion of the response to the user. In some embodiments, the response module 314 issues the response by sending an audio signal to the audio processor 306, which performs any processing that may be needed, for example amplifying the signal for driving a speaker 338.

Figure 4:
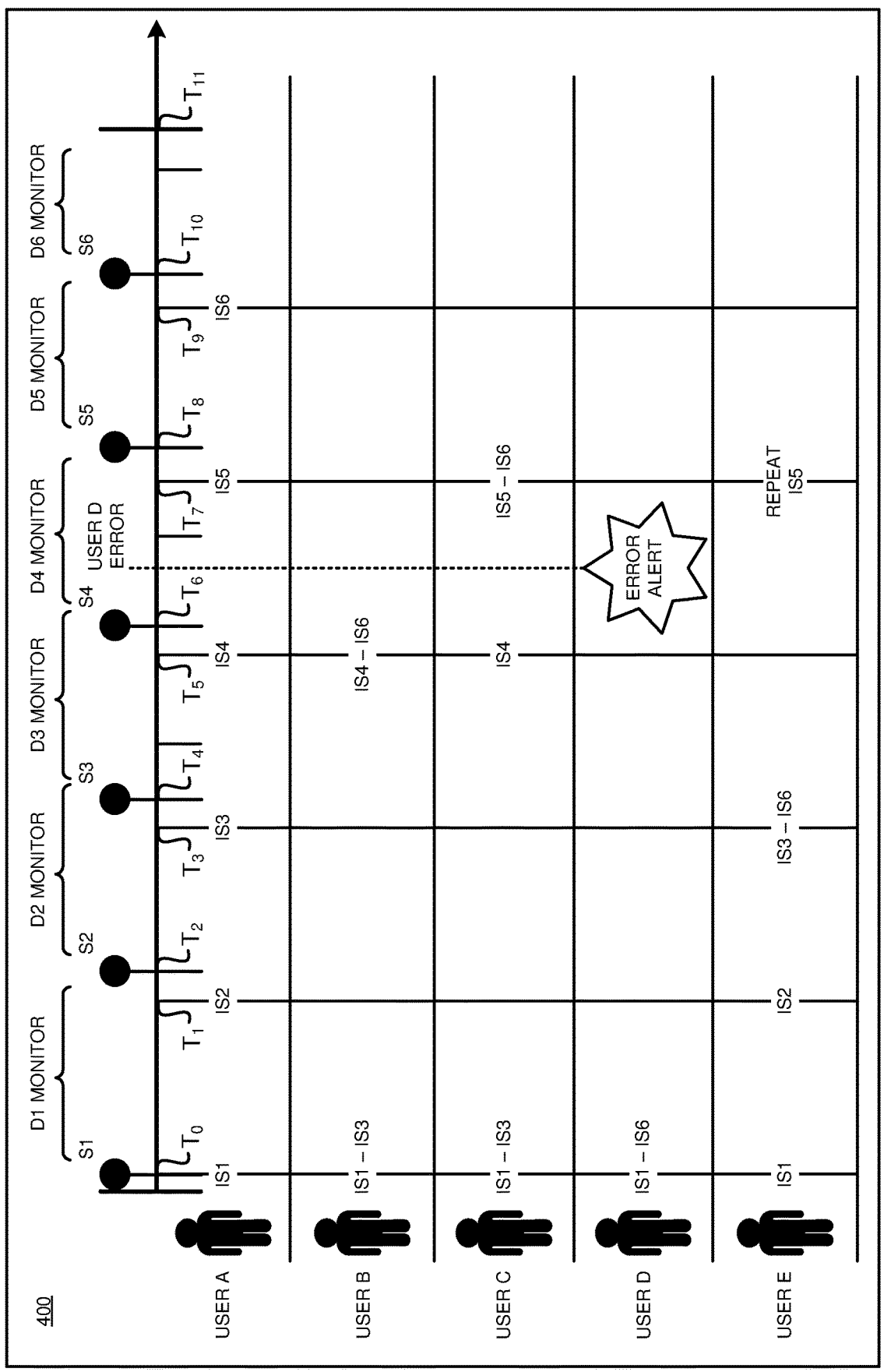
FIG. 4 depicts a timing diagram for an example configuration of an AI-based virtual assistant in accordance with an illustrative embodiment.

With reference to FIG. 4, this figure depicts a timing diagram for an example configuration 400 of an AI-based virtual assistant in accordance with an illustrative embodiment. The embodiment shown and described in connection with FIG. 4 is a non-limiting example provided for purposes of improved clarity.

In the illustrative embodiment, a timeline is shown that relates to an example where a user has issued a voice command to a virtual assistant requesting instructions for completing a task. The virtual assistant located content for the response, which involves a task that has six steps S1-S6.

The response include six sets of instructions IS1-IS6 that correspond to the six respective steps S1-S6. The virtual assistant begins to respond to the voice command at time T0. The timing diagram in FIG. 4 shows five different scenarios for how the virtual assistant times how it provides the six sets of instructions IS1-IS6 for the six steps S1-S6 to Users A-E based on respective different timing preferences of these users.

In the illustrative embodiment, for User A, the virtual assistant begins by issuing only the instructions IS1 for the first step S1. As indicated above the timeline, the virtual assistant then monitors the progress of User A while User A completes the first step S1. At time T1 the virtual assistant detects that User A is near completing, or has completed, the first step S1, so the virtual assistant automatically issues the instructions IS2 for the second step S2. The User A then begins step S2 at time T2 and again the virtual device monitors the progress of User A while User A completes the second step S2. At time T3 the virtual assistant detects that User A is near completing, or has completed, the second step S2, so the virtual assistant automatically issues the instructions IS3 for the third step S3. The process continues in this way through completion of the last step S6 with the virtual device waiting to give instructions for a step until User A is ready to begin that step.

In the illustrative embodiment, for User B, the virtual assistant begins by issuing instructions IS1-IS3 for the first three steps S1-S3 based on user preferences and/or background that indicates that User B has experience in performing this task, or prefers to get several instructions at once, but not necessarily all instructions at once. As indicated above the timeline, the virtual assistant then monitors the progress of User B while User B completes the first three steps S1-S3. At time T5 the virtual assistant detects that User B is near completing, or has completed, the third step S3, so the virtual assistant automatically issues the instructions IS4-IS6 for the last three steps S4-S6. The User B then begins step S4 at time T6 and again the virtual device monitors the progress of User B while User B completes the last three steps S4-S6.

In the illustrative embodiment, for User C, the virtual assistant begins by issuing instructions IS1-IS3 for the first three steps S1-S3 based on user preferences and/or background that indicates that User C has experience in performing this task, or prefers to get several instructions at once, but not necessarily all instructions at once, similar to User B. However, the user profile for User C indicates that User C has previously struggled with Step 4, so at time T5 the virtual assistant only provides instructions IS4 for step S4 in order to allow User C to focus on step S4 before receiving the remainder of the instructions S5-S6.

In the illustrative embodiment, for User D, the virtual assistant begins by issuing all of the instructions IS1-IS6 at once based on user preferences or based on user profile data indicating that User D has extensive experience in performing this task or based on the virtual assistant detecting that User D is experiencing a sense of anxiety or urgency and therefore wants all of the instructions to be quickly provided. The timeline for User D also illustrates an example where the virtual assistant detects an error while monitoring User D's progress. In the illustrated example, the error is detected while User D is performing the fourth step S4. The virtual assistant issues an alert to User D to inform User D of the detected error. In some embodiments, the error alert includes a repeat of the instructions for S4 or for a relevant portion of S4 related to the error.

In the illustrative embodiment, for User E, the virtual assistant begins in a manner similar to User A by issuing only the instructions IS1 for the first step S1, and waiting to issue instructions for the second step S2 until the User E is ready to begin the second step. However, the virtual assistant detects a change in the mental state of User E suggesting that User E is growing impatient or frustrated waiting for the next instruction instead of getting more instructions at once. In response, the virtual assistant changes to providing instructions IS3-IS6 all at once rather than to continue to wait on a step-by-step basis. The example for User E also shows an example of a user requesting a repeat of some of the instructions at time T5 and, in response, the virtual assistant repeats the instructions as requested.

Figure 5:
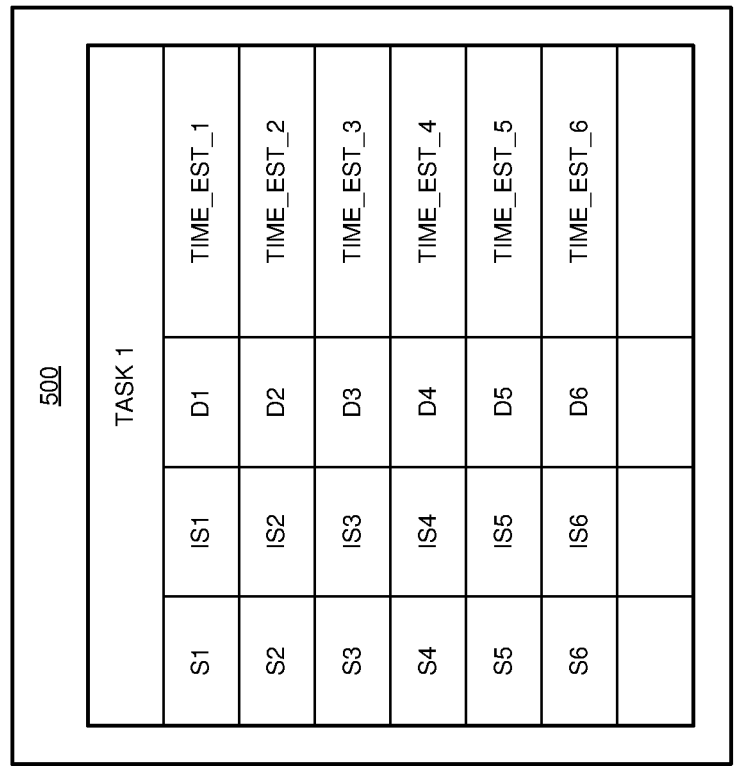
FIG. 5 depicts a schematic diagram of an example of a data table for an AI-based virtual assistant in accordance with an illustrative embodiment.

With reference to FIG. 5, this figure depicts a schematic diagram of an example of a data table 500 for an AI-based virtual assistant in accordance with an illustrative embodiment. The embodiment shown and described in connection with FIG. 5 is a non-limiting example of a data table 500 that corresponds with the six-step task described in connection with the timeline shown in FIG. 4. The data table 500 can be stored in a database in the virtual device, for example in the knowledge database 318, or in a corpus of knowledge stored remotely.

In an embodiment, the virtual assistant creates the table while the user is performing the task. The table includes an indication of the steps S1-S6 involved in the task, as well as the instructions IS1-IS6 for each task. The data table 500 can also include data D1-D6 and time information TIME_EST_1-TIME_EST_6. In an embodiment, the time information includes amounts of time that the user took to complete each step, which can be used as time estimates for the next time the user will perform this task. The data D1-D6 can include other information, such as whether the user struggled with some part of the task or mastered some part of the task. In an embodiment, this information is used to create a response schedule the next time the user performs this task.

Figure 6:
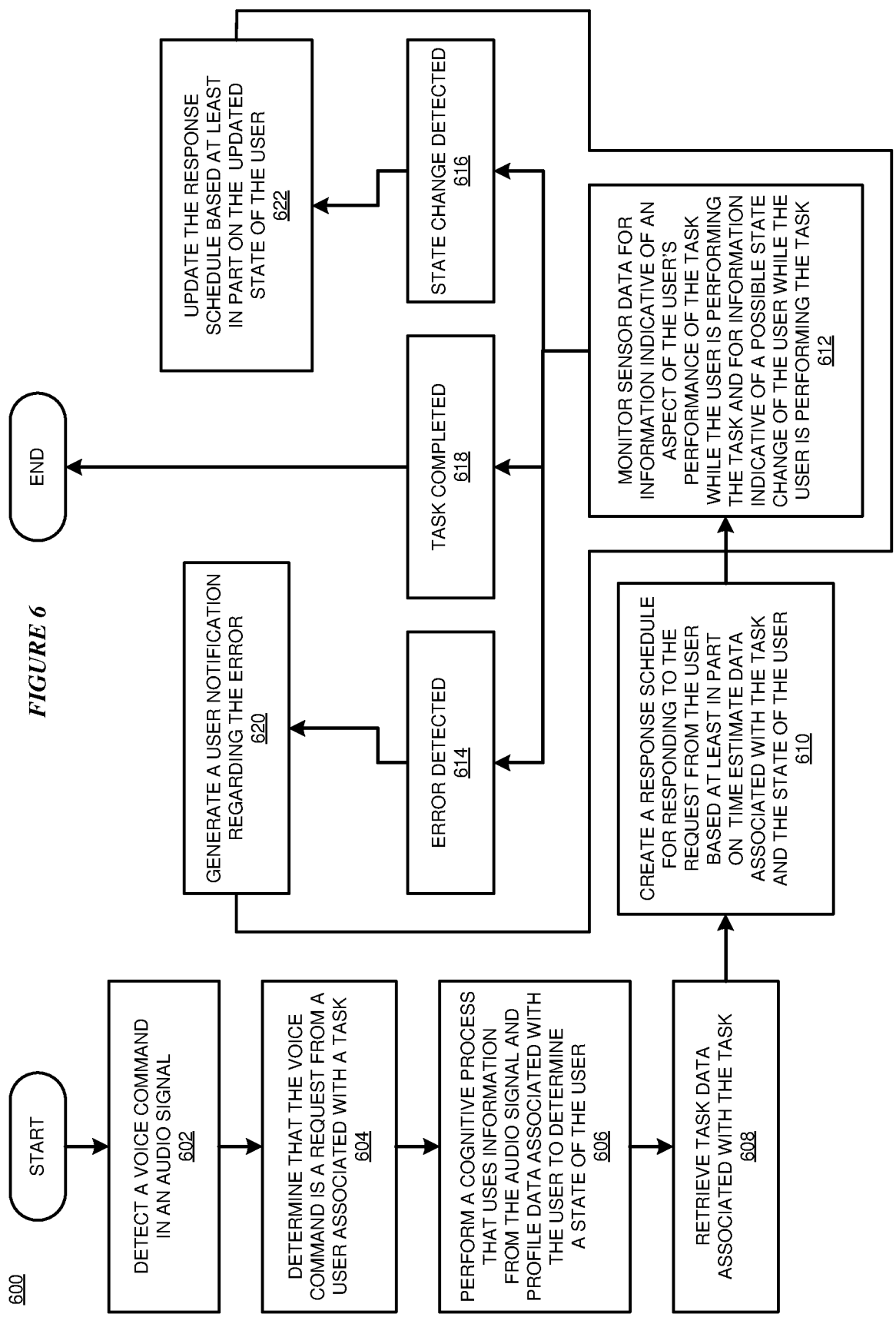
FIG. 6 depicts a flowchart of an example process for cognitive adjustment of responses from an AI-based virtual assistant in accordance with an illustrative embodiment.

With reference to FIG. 6 this figure depicts a flowchart of an example process 600 for cognitive adjustment of responses from a virtual assistant in accordance with an illustrative embodiment. In a particular embodiment, the virtual assistant 302 carries out the process 600.

In an embodiment, at block 602, the process detects verbal content in an audio signal. Next, at block 604, the process determines that the verbal content includes a voice command associated with a task by correlating the verbal content with voice command data stored in memory. For example, in some embodiments, the process uses NLP to extract text from the audio signal. Next, at block 606, the process determines a state of the user from the audio signal by cognitively comparing aspects of the verbal content with aspects of profile data associated with the user. For example, in some embodiments, the process uses a deep neural network to analyze the text extracted from the audio signal for evidence of a mental state of the user. Next, at block 608, the process retrieves task data associated with the task. For example, in some embodiments, the process retrieves task data from local memory and from remote data sources, such as Internet sources and a corpus of knowledge shared with one or more other AI devices. Next, at block 610, the process creates a response schedule for responding to the request from the user based at least in part on time estimate data associated with the task and/or the state of the user.

In some embodiments, at block 612, the process monitors sensor data for information indicative of an aspect of the user's performance of the task while the user is performing the task and for information indicative of a possible state change of the user while the user is performing the task. If the process receives information indicative of an aspect of the user's performance of the task, the process continues to block 614 where the process detects an error and then to block 620 where the process notifies the user of an error while performing the task. If the process receives information indicative of possible state change of the user while the user is performing the task, the process continues to block 616 and then to block 622 where the process updates the response schedule based at least in part on the updated mental state of the user. If the process detects that the user is no longer performing the task, the process continues to block 618 and ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
   detecting, using a processor, verbal content in an audio signal;
   determining, using the processor, that the verbal content includes a voice command associated with a task by correlating the verbal content with voice command data stored in memory, wherein the voice command comprises a request from a user for instructions for completing the task;

determining, using the processor, a state of the user from the audio signal by cognitively comparing aspects of the verbal content with aspects of profile data associated with the user;

retrieving, using the processor, task data associated with the task for preparing a response to the voice command;

classifying, using the processor, image data according to an amount of progress in performing the task, wherein the image data is extracted from video generated by an image sensor arranged to monitor the progress of the user in performing the task; and creating, using the processor, a response schedule for the response based at least in part on the task data and the state of the user, wherein the creating of the response schedule comprises generating a data table that associates steps of the task with respective time estimates for completing an associated step of the task, wherein at least one time estimate is based at least in part on previously-stored data indicating an amount of time previously used by the user to complete an associated step.

2. The computer implemented method of claim 1, wherein the creating of the response schedule includes identifying a first part of the response and a second part of the response and establishing a condition for issuing the second part of the response.

3. The computer implemented method of claim 2, wherein the task data includes descriptions of the steps of the task, wherein the steps include first and second steps for completing the task, and wherein the first part of the response is associated with the first step and the second part of the response is associated with the second step.

4. The computer implemented method of claim 3, wherein the condition for issuing the second part of the response is based at least in part on a time estimate associated with the first step.

5. The computer implemented method of claim 4, wherein user profile information comprises the previously-stored data that indicates the amount of time previously used by the user to complete the associated step.

6. The computer implemented method of claim 2, further comprising:

monitoring, using the processor, the image data for information indicative of the user's performance of the task while the user is performing the task; and determining, using the processor, the amount of progress made by the user in performing the task by cognitively comparing aspects of the image data with information associated with the task.

7. The computer implemented method of claim 6, wherein the determining of the amount of progress made by the user includes determining whether the amount of progress made by the user satisfies the condition for issuing the second part of the response.

8. The computer implemented method of claim 1, further comprising:

monitoring, using the processor, the image data for information indicative of the user's performance of the task while the user is performing the task;

performing, using the processor, a cognitive process using the image data that compares the image data with information associated with the task and provides an indication of a likelihood of an error by the user while performing the task; and generating, using the processor, a user notification regarding the error.

9. The computer implemented method of claim 1, further comprising:

monitoring, using the processor, the image data for information indicative of a possible state change of the user while the user is performing the task;

performing, using the processor, a cognitive process that uses the information indicative of the possible state change of the user and profile data associated with the user to determine an updated state of the user; and updating, using the processor, the response schedule based at least in part on the updated state of the user, thereby generating a revised response schedule.

10. The computer implemented method of claim 9, wherein the updating of the response schedule includes generating a terser response for the revised response schedule.

11. The computer implemented method of claim 10, further comprising:

generating, using the processor, user profile data indicative of the user preferring the terser response of the revised response schedule.

12. A computer usable program product for generating contrastive information for a classifier prediction, the computer usable program product comprising a computer-readable storage device, and program instructions stored on the storage device, the stored program instructions comprising:

program instructions to detect, using a processor, verbal content in an audio signal;

program instructions to determine, using the processor, that the verbal content includes a voice command associated with a task by correlating the verbal content with voice command data stored in memory, wherein the voice command comprises a request from a user for instructions for completing the task;

program instructions to determine, using the processor, a state of the user from the audio signal cognitively comparing aspects of the verbal content with aspects of profile data associated with the user;

program instructions to retrieve, using the processor, task data associated with the task for preparing a response to the voice command;

classifying, using the processor, image data according to an amount of progress in performing the task, wherein the image data is extracted from video generated by an image sensor arranged to monitor the progress of the user in performing the task; and program instructions to create, using the processor, a response schedule for the response based at least in part on the task data and the state of the user, wherein the program instructions to create the response schedule comprise program instructions to generate a data table that associates steps of the task with respective time estimates for completing an associated step of the task, wherein at least one time estimate is based at least in part on previously-stored data indicating an amount of time previously used by the user to complete an associated step.

13. A computer usable program product of claim 12, wherein the creating of the response schedule includes identifying a first part of the response and a second part of the response and establishing a condition for issuing the second part of the response;

wherein the task data includes descriptions of first and second steps for completing the task, and wherein the first part of the response is associated with the first step and the second part of the response is associated with the second step;

wherein the condition for issuing the second part of the response is based at least in part on a time estimate associated with the first step; and wherein the time estimate is based at least in part on user profile information that includes an amount of time used by the user to complete the first step during a previous performance of the task.

14. A computer usable program product of claim 12, wherein the creating of the response schedule includes identifying a first part of the response and a second part of the response and establishing a condition for issuing the second part of the response;

wherein the stored program instructions further comprise:

program instructions to monitor, using the processor, the image data for information indicative of the user's performance of the task while the user is performing the task; and program instructions to determine, using the processor, an amount of progress made by the user in performing the task by cognitively comparing aspects of the image data with information associated with the task; and wherein the determining of the amount of progress made by the user includes determining whether the amount of progress made by the user satisfies the condition for issuing the second part of the response.

15. A computer usable program product of claim 12, further comprising:

program instructions to monitor, using the processor, the image data for information indicative of a possible state change of the user while the user is performing the task;

program instructions to perform, using the processor, a cognitive process that uses the information indicative of the possible state change of the user and profile data associated with the user to determine an updated state of the user; and program instructions to update, using the processor, the response schedule based at least in part on the updated state of the user, thereby generating a revised response schedule.

16. The computer usable program product of claim 12, wherein the stored program instructions are stored in a computer readable storage device in a data processing system, and wherein the stored program instructions are transferred over a network from a remote data processing system.

17. The computer usable program product of claim 12, wherein the stored program instructions are stored in a computer readable storage device in a server data processing system, and wherein the stored program instructions are downloaded over a network to a remote data processing system for use in a computer readable storage device associated with the remote data processing system, further comprising:

program instructions to meter use of the computer usable code associated with the request; and program instructions to generate an invoice based on the metered use.

18. A computer system comprising a processor, a computer-readable memory, and a computer-readable storage device, and program instructions stored on the storage device for execution by the processor via the memory, the stored program instructions comprising:

program instructions to detect, using the processor, verbal content in an audio signal;

program instructions to determine, using the processor, that the verbal content includes a voice command associated with a task by correlating the verbal content with voice command data stored in memory, wherein the voice command comprises a request from a user for instructions for completing the task;

program instructions to determine, using the processor, a state of the user from the audio signal cognitively comparing aspects of the verbal content with aspects of profile data associated with the user;

program instructions to retrieve, using the processor, task data associated with the task for preparing a response to the voice command;

classifying, using the processor, image data according to an amount of progress in performing the task, wherein the image data is extracted from video generated by an image sensor arranged to monitor the progress of the user in performing the task; and program instructions to create, using the processor, a response schedule for the response based at least in part on the task data and the state of the user, wherein the program instructions to create the response schedule comprise program instructions to generate a data table that associates steps of the task with respective time estimates for completing an associated step of the task, wherein at least one time estimate is based at least in part on previously-stored data indicating an amount of time previously used by the user to complete an associated step.

19. The computer system of claim 18, wherein the creating of the response schedule includes identifying a first part of the response and a second part of the response and establishing a condition for issuing the second part of the response;

wherein the stored program instructions further comprise:

program instructions to monitor, using the processor, the image data for information indicative of the user's performance of the task while the user is performing the task; and program instructions to determine, using the processor, an amount of progress made by the user in performing the task by cognitively comparing aspects of the image data with information associated with the task; and wherein the determining of the amount of progress made by the user includes determining whether the amount of progress made by the user satisfies the condition for issuing the second part of the response.

20. The computer system of claim 18, further comprising:

program instructions to monitor, using the processor, the image data for information indicative of a possible state change of the user while the user is performing the task;

program instructions to perform, using the processor, a cognitive process that uses the information indicative of the possible state change of the user and profile data associated with the user to determine an updated state of the user; and program instructions to update, using the processor, the response schedule based at least in part on the updated state of the user, thereby generating a revised response schedule.

\* \* \* \* \*